US009299475B2

(12) United States Patent
Uehara et al.

(10) Patent No.: US 9,299,475 B2
(45) Date of Patent: *Mar. 29, 2016

(54) POSITIVE ELECTRODE ACTIVE MATERIAL FOR SECONDARY BATTERY AND SECONDARY BATTERY USING THE SAME

(75) Inventors: Makiko Uehara, Tokyo (JP); Takehiro Noguchi, Tokyo (JP); Hideaki Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 173 days.

This patent is subject to a terminal disclaimer.

(21) Appl. No.: 13/881,301

(22) PCT Filed: Nov. 4, 2011

(86) PCT No.: PCT/JP2011/075448
§ 371 (c)(1),
(2), (4) Date: Apr. 24, 2013

(87) PCT Pub. No.: WO2012/060444
PCT Pub. Date: May 10, 2012

(65) Prior Publication Data
US 2013/0221269 A1    Aug. 29, 2013

(30) Foreign Application Priority Data
Nov. 5, 2010    (JP) .................... 2010-248778

(51) Int. Cl.
*H01B 1/08*    (2006.01)
*H01M 4/505*    (2010.01)
(Continued)

(52) U.S. Cl.
CPC .............. *H01B 1/08* (2013.01); *C01G 45/1242* (2013.01); *C01G 49/00* (2013.01); *C01G 49/009* (2013.01);
(Continued)

(58) Field of Classification Search
CPC .. H01M 4/525; H01M 4/505; C01G 45/1242; C01G 49/00; C01G 49/009; C01G 53/54; H01B 1/08
See application file for complete search history.

(56) References Cited

U.S. PATENT DOCUMENTS 7,179,566 B2 *   2/2007   Kawasaki et al. ........ 429/231.95
2003/0086863 A1   5/2003   Noguchi et al.
2006/0275664 A1   12/2006   Ohzuku et al.

FOREIGN PATENT DOCUMENTS

CN      1545743 A    11/2004
EP      885845 A1 *   12/1998
(Continued)

OTHER PUBLICATIONS
STIC Search Result Transcript received on Nov. 14, 2014.*
(Continued)

*Primary Examiner* — Mark Kopec
*Assistant Examiner* — Matthew R Diaz
(74) *Attorney, Agent, or Firm* — Sughrue Mion, PLLC

(57) ABSTRACT

A positive electrode active material for a lithium ion secondary battery having high discharge energy and capable of suppressing capacity drop with cycles and a secondary battery using the same are provided at lower cost. A positive electrode active material for a secondary battery according to a first aspect of the exemplary embodiment is represented by the following formula (I): $Li_a(Fe_xNi_yMn_{2-x-y})O_4$ (I) where $0.2<x\leq1.2$, $0<y<0.5$ and $0\leq a\leq1.2$. Furthermore, a positive electrode active material for a secondary battery according to a second aspect of the exemplary embodiment is represented by the following formula (II): $Li_a(Fe_xNi_yMn_{2-x-y-z}A_z)O_4$ (II) where $0.2\leq x\leq1.2$, $0<y<0.5$, $0\leq a\leq1.2$ and $0<z\leq0.3$; A is at least one selected from the group consisting of Li, B, Na, Mg, Al, K and Ca.

20 Claims, 2 Drawing Sheets

(51) Int. Cl.

| | |
|---|---|
| *H01M 4/525* | (2010.01) |
| *C01G 45/12* | (2006.01) |
| *C01G 49/00* | (2006.01) |
| *C01G 53/00* | (2006.01) |
| *H01M 10/052* | (2010.01) |

(52) U.S. Cl.
CPC ............... *C01G 53/54* (2013.01); *H01M 4/505* (2013.01); *H01M 4/525* (2013.01); *C01P 2002/52* (2013.01); *C01P 2006/40* (2013.01); *H01M 10/052* (2013.01); *Y02E 60/122* (2013.01); *Y02P 70/54* (2015.11)

(56) References Cited

FOREIGN PATENT DOCUMENTS

| JP | 3-108261 A | 5/1991 |
|---|---|---|
| JP | 4-282560 A | 10/1992 |
| JP | 4-289662 A | 10/1992 |
| JP | 8-17423 A | 1/1996 |
| JP | 9-147867 A | 6/1997 |
| JP | 2000-90923 A | 3/2000 |
| JP | 2000-235857 A | 8/2000 |
| JP | 2000-306577 A | 11/2000 |
| JP | 2001-202962 A | 7/2001 |
| JP | 2001-273899 A | 10/2001 |
| JP | 2002-42814 A | 2/2002 |
| JP | 2002-158008 A | 5/2002 |
| JP | 2003-197194 A | 7/2003 |
| JP | 2007-305549 A | 11/2007 |
| JP | 2010-97845 A | 4/2010 |

OTHER PUBLICATIONS

R. Alcantara, et al., "Synergistic Effects of Double Substitution in $LiNi_{0.5-y}Fe_yMn_{1.5}O_4$ Spinel as 5 V Cathode Materials", Journal of the Electrochemical Society, 2005, pp. A13-A18, vol. 152, No. 1.

S. Rajakumar, "Electrochemical Behavior of $LiM_{0.25}Ni_{0.25}Mn_{1.5}O_4$ as 5 V Cathode Materials for Lithium Rechargeable Batteries", Journal of the Electrochemical Society, 2009, pp. A246-A252, vol. 156, No. 3.

Hiroo Kawai, et al., "High-voltage lithium cathode materials", Journal of Power Sources, 1999, pp. 67-72, vol. 81-82.

Tsutomu Ohzuku, et al., "Solid-state redox potentials for $Li[Me_{frax;1;2}Mn_{frax;3;2}]O_4$ (Me: 3d-transition metal) having spinel-framework structures: a series of 5 volt materials for advanced lithium-ion batteries", Journal of Power Sources, 1999, pp. 90-94, vol. 81-82.

Communication dated Sep. 28, 2014 from the State Intellectual Property Office on the People's Republic of China in counterpart application No. 201180045752.4.

\* cited by examiner

POSITIVE ELECTRODE ACTIVE MATERIAL FOR SECONDARY BATTERY AND SECONDARY BATTERY USING THE SAME

CROSS REFERENCE TO RELATED APPLICATIONS

This application is a National Stage of International Application No. PCT/JP2011/075448, filed on Nov. 4, 2011, which claims priority from Japanese Patent Application No. 2010-248778, filed on Nov. 5, 2010, the contents of all of which are incorporated herein by reference in their entirety.

TECHNICAL FIELD

An exemplary embodiment relates to a positive electrode active material for a lithium secondary battery and a secondary battery using the same.

BACKGROUND ART

A lithium ion secondary battery using a nonaqueous electrolytic solution providing a high voltage is characterized by high energy density and widely used as power sources for mobile phones, notebook computers and others. Recently, with tightened $CO_2$ regulation, use of a secondary battery in large-size products such as electric cars has drawn attention. In the circumstances, it has been desired to solve problems for improving safety and life and reducing cost.

As a positive electrode active material for a lithium ion secondary battery, $LiCoO_2$ is well known. Since $LiCoO_2$ has satisfactory characteristics, it is used in many lithium ion secondary batteries. However, Co as a raw material is expensive and a resource is uneven distributed. Like this, many variation factors are associated with $LiCoO_2$ as problems. Particularly, when it is used in large-size products, price and constant supply of a resource are important for selecting a material. Thus, study of an alternate material is indispensable.

As another positive electrode active material, $LiNiO_2$ is mentioned. Compared to Co, Ni is a raw material supplied from an abundant resource; but the price greatly varies due to demand balance. In $LiNiO_2$, trivalent Ni is unstable and likely to change into divalent Ni, with the result that $LiNiO_2$ changes into a non-stoichiometric composition. Furthermore, divalent Ni may possibly invade into a lithium site. For these reasons, it is difficult to control synthesis of $LiNiO_2$. In addition, since $LiNiO_2$ is thermally unstable, it is difficult to ensure safety of a secondary battery.

On the other hand, in view of cost and safety, a lithium manganese composite oxide, $LiMn_2O_4$, of a spinel type crystal structure having a three-dimensional lithium diffusion route is highly expected. A resource for Mn as a raw material for $LiMn_2O_4$ is abundant and relatively inexpensive. Besides these, Mn rarely causes thermal decomposition during overcharge and at a high temperature. Thus, Mn is advantageous in view of ensuring safety. However, $LiMn_2O_4$ causes e.g., deterioration with cycles and elution of Mn into an electrolytic solution if $LiMn_2O_4$ is stored at a high temperature. They are regarded as problems. These are caused by Jahn-Teller strain of trivalent Mn increased with Li insertion. As a result, the crystal structure is destabilized and performance deterioration and the like conceivably occur with cycles.

In order to reduce the Jahn-Teller strain, an attempt to substitute trivalent Mn with another element has been made. For example, Patent Literature 1 discloses that a capacity retention rate can be improved during overdischarge by using a lithium manganese composite oxide having a spinel structure and having a composition represented by formula $Li_xMn_{(2-y)}Al_yO_4$ ($0.85 \leq x \leq 1.15$, $0.02 \leq y \leq 0.5$), in which a part of Mn is substituted with Al, as a positive electrode active material. Furthermore, it has been confirmed that an effect of improving e.g., life is exerted by substitution with e.g., Mg and Ca (Patent Literature 2), Ti (Patent Literature 3) and Co, Ni, Fe, Cr (Patent Literature 4).

A lithium manganese composite oxide is a so-called 4 V-level positive electrode having a discharge potential of 4.2 V or less and a small discharge capacity. Thus, there is a technical problem in increasing energy density. As a method for improving the energy density of a lithium ion secondary battery, a method of increasing the action potential of a secondary battery is effective. Up to present, it is known to realize a 5 V-level action potential by substituting a part of Mn of $LiMn_2O_4$ with Ni, Co, Fe, Cu, Cr and the like (for example, Patent Literature 5, Non Patent Literature 1 and Non Patent Literature 2). These are called as a 5 V-level positive electrode.

Of them, a lithium manganese composite oxide in which a part of Mn site is substituted with Ni exhibits a flat discharge potential and a high capacity in the region of 4.5 V or more, and thus, expected as a high potential positive electrode active material. For example, in the case where a part of Mn site is substituted with Ni, Mn is present in a quadrivalent state. Discharge occurs by the reaction of $Ni^{2+} \to Ni^{4+}$ instead of the reaction $Mn^{3+} \to Mn^{4+}$. Since the reaction of $Ni^{2+} \to Ni^{4+}$ provides a high potential of about 4.7 V, the lithium manganese composite oxide functions as a high-potential electrode material.

On the other hand, in various industrial fields including the automobile industry, it is expected to increase the demand for a lithium ion secondary battery. In the circumstance, a lithium manganese composite oxide using Fe as a substitution element is extremely advantageous in view of resource, environment and cost. In the case where a part of Mn site is substituted with Fe, the reaction of $Fe^{3+} \to Fe^{4+}$ occurs in place of the reaction of $Mn^{3+} \to Mn^{4+}$. The reaction of $Fe^{3+} \to Fe^{4+}$ is known to occur at near 4.9 V. Up to present, a high potential spinel material in which a part of Mn site is substituted with Fe has been disclosed (Patent Literature 6 and Patent Literature 7).

CITATION LIST

Patent Literature

Patent Literature 1: JP04-289662A
Patent Literature 2: JP03-108261A
Patent Literature 3: JP08-17423A
Patent Literature 4: JP04-282560A
Patent Literature 5: JP09-147867A
Patent Literature 6: JP2000-90923A
Patent Literature 7: JP2010-97845A
Patent Literature 8: JP2000-235857A
Patent Literature 9: JP2002-42814A
Patent Literature 10: JP2002-158008A

Non Patent Literature

Non Patent Literature 1: H. Kawai, et al., Journal of Power Sources, vol. 81-82, pp. 67-72, 1999

Non Patent Literature 2: T. Ohzuku, et al., Journal of Power Sources, vol. 81-82, pp. 90-94, 1999

SUMMARY OF INVENTION

Technical Problem

In the case where a part of Mn is substituted with Fe, if the composition ratio x of Fe in a composition formula $Li_a(Fe_xMn_{2-x})O_4$ is 1, theoretically all of Mn become quadrivalent. Therefore, owing to the reaction of $Fe^{3+} \rightarrow Fe^{4+}$ at a high potential, an increase of energy density is expected. However, if the composition ratio x of Fe comes closer to 1, the structure is destabilized, with the result that synthesis becomes difficult; at the same time, capacity drop occurs. Because of this, also in Patent Literature 6 and Patent Literature 7, if a substitution element is Fe alone, sufficient discharge energy cannot be obtained. In addition, capacity drop occurs with cycles.

Documents (Patent Literature 8, Patent Literature 9 and Patent Literature 10) disclose a 5 V-level positive electrode obtained by substituting a part of Mn with various types of elements such as Ni and Fe. In these documents, the substitution amounts with Fe each are slightly low. Further improvement is desired in reducing cost. Furthermore, these documents are silent about valence change of Fe. As the substitution amount with Fe increases, the discharge energy reduces and capacity drop occurs with cycles.

One of the objects of the exemplary embodiment is to provide a positive electrode active material for a secondary battery having a high discharge energy at low cost and a secondary battery using the same. Another object of the exemplary embodiment is to provide a positive electrode active material for a secondary battery, capable of suppressing capacity drop with cycles at low cost and a secondary battery using the same.

Solution to Problem

A positive electrode active material for a secondary battery according to a first aspect of the exemplary embodiment is represented by the following formula (I):

$$Li_a(Fe_xNi_yMn_{2-x-y})O_4 \qquad (I)$$

where $0.2 < x \leq 1.2$, $0 < y < 0.5$ and $0 \leq a \leq 1.2$.

A positive electrode active material for a secondary battery according to a second aspect of the exemplary embodiment is represented by the following formula (II):

$$Li_a(Fe_xNi_yMn_{2-x-y-z}A_z)O_4 \qquad (II)$$

where $0.2 \leq x \leq 1.2$, $0 < y < 0.5$, $0 \leq a \leq 1.2$ and $0 < z \leq 0.3$; A is at least one selected from the group consisting of Li, B, Na, Mg, Al, K and Ca.

Advantageous Effects of Invention

According to the first aspect of the exemplary embodiment, it is possible to realize cost reduction and an increase of discharge energy. According to the second aspect of the exemplary embodiment, it is possible to realize cost reduction and suppression of capacity drop with cycles.

DESCRIPTION OF EMBODIMENTS

Figure 1:
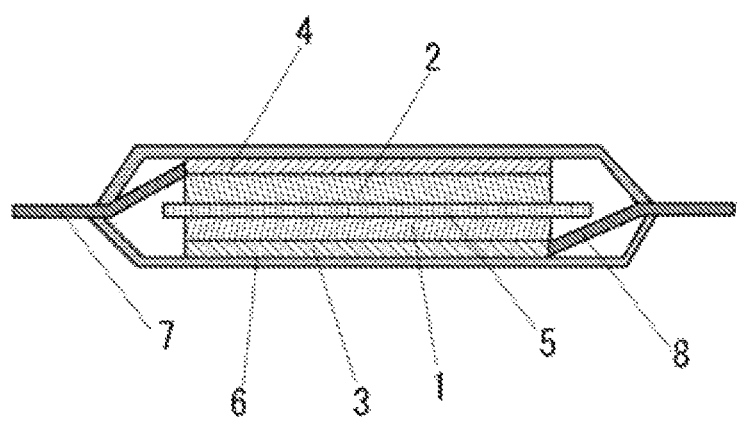
FIG. 1 is a sectional view showing an example of a secondary battery according to an exemplary embodiment.

[Positive Electrode Active Material for Secondary Battery]

A technique for substituting Mn with another element is disclosed in many reports on a 4 V-level positive electrode. However, these disclosures are directed to increasing stability of a crystal structure; whereas, the positive electrode active material for a secondary battery according to the exemplary embodiment is characterized by ensuring an operation at a high potential using valence change of substitution elements, Ni and Fe.

Fe is an extremely advantageous material in view of raw material cost and resource; however sufficient energy density has not been obtained. In the case of Ni, a raw material cost greatly varies. An electrolytic solution is easily decomposed by the catalyst function of Ni. Likewise, Ni has a problem in view of extending life. In the positive electrode active material for a secondary battery according to the first aspect of the exemplary embodiment, reducing cost and increasing discharge energy can be realized by substituting a part of Mn with Fe and Ni. In addition, in the positive electrode active material for a secondary battery according to the second aspect of the exemplary embodiment, reducing cost and suppressing capacity drop with cycles can be realized by substituting a part of Mn with not only Fe and Ni but also element A.

First Exemplary Embodiment

The positive electrode active material for a secondary battery according to the first aspect of the exemplary embodiment is represented by the following formula (I):

$$Li_a(Fe_xNi_yMn_{2-x-y})O_4 \qquad (I)$$

where $0.2 < x \leq 1.2$, $0 < y < 0.5$ and $0 \leq a \leq 1.2$.

In the formula (I), the composition ratio x of Fe satisfies $0.2 < x \leq 1.2$. The case where x is 0.2 or less is not preferable in view of reducing cost and extending life. In contrast, if x exceeds 1.2, a crystal structure is destabilized and capacity drop occurs. This case is not preferable. In the formula (I), the composition ratio x of Fe is preferably $0.3 < x \leq 1.0$ and more preferably $0.4 \leq x \leq 0.8$.

In the formula (I), the composition ratio y of Ni is $0 < y < 0.5$. The case where y=0, in short, Ni is not contained is not preferable in view of increasing capacity. In contrast, the case where y is 0.5 or more is not preferable in view of extending life. In the formula (I), the composition ratio y of Ni is preferably $0.1 \leq y \leq 0.4$ and more preferably $0.2 \leq y \leq 0.4$.

A substitution element, Fe, for Mn is preferably trivalent in a discharge state and Ni is preferably divalent. If Mn is substituted with Fe, in the case where the composition ratio x of Fe is 1 in the formula (I), all of Mn are quadrivalent. In contrast, if Mn is substituted with Ni, in the case where the composition ratio y of Ni is 0.5, all of Mn are quadrivalent. In the exemplary embodiment, since Mn is substituted with both of Fe and Ni, it is preferable that, in the formula (I), $0.5 \leq x + 2y \leq 1.3$, more preferable that $0.6 \leq x + 2y \leq 1.2$, and particularly preferable that $x + 2y = 1$.

In the formula (I), the composition ratio a of Li satisfies $0 \leq a \leq 1.2$. The composition ratio a of Li preferably satisfies $0.8 \leq a \leq 1.1$.

The positive electrode active material for a secondary battery according to the first aspect of the exemplary embodiment preferably has a charge-discharge region due to valence change between a trivalence and a quadrivalence of Fe. The valence change between a trivalence and a quadrivalence of Fe occurs at 4.8 V or more to a lithium reference potential.

Note that, whether the charge-discharge region is present or not can be determined by the discharge curve of a secondary battery using a target positive electrode active material.

The specific surface area of the positive electrode active material for a secondary battery according to the first aspect of the exemplary embodiment is preferably 0.01 m²/g or more and 3 m²/g or less, and more preferably 0.05 m²/g or more and 1 m²/g or less. If the specific surface area is 3 m²/g or less, a large amount of binder is not required in preparing a positive electrode. It is advantageous in view of the capacity density of a positive electrode. Note that, the value of the specific surface area is measured by the BET method.

Examples of the raw material of the positive electrode active material for a secondary battery according to the first aspect of the exemplary embodiment are not particularly limited. For example, as a Li raw material, $Li_2CO_3$, LiOH, $Li_2O$, $Li_2SO_4$ and the like can be used. Of them, $Li_2CO_3$ and LiOH are preferable. As a Mn raw material, various Mn oxides such as electrolyzed manganese dioxide (EMD), $Mn_2O_3$, $Mn_3O_4$ and CMD (chemical manganese dioxide), $MnCO_3$, $MnSO_4$ and others can be used. As a Fe raw material, $Fe_2O_3$, $Fe_3O_4$, Fe(OH)$_2$, FeOOH and others can be used. As a Ni raw material, NiO, Ni(OH), $NiSO_4$, $Ni(NO_3)_2$ and others can be used. As a raw material of element A, an oxide, a carbonate, a hydroxide, sulfide, nitrate of element A and others can be used. These may be used alone or in combination of two types or more.

These raw materials are weighed so as to satisfy a desired metal composition ratio and mixed. Mixing can be made by pulverizing and blending by a ball mill, a jet mill and others. The obtained powder mixture is baked at a temperature from 400° C. to 1200° C. in air or oxygen to obtain a lithium manganese composite oxide serving as a positive electrode active material. To diffuse individual elements, the baking temperature is preferably high. However, if the baking temperature is excessively high, oxygen deficiency occurs and battery characteristics may possibly deteriorate. From this, the baking temperature is preferably 450° C. to 1000° C. Note that, in the formula (I), the composition ratio of individual elements is calculated from supply amounts of raw materials of the individual elements.

Second Exemplary Embodiment

A positive electrode active material for a secondary battery according to the second aspect of the exemplary embodiment is represented by the following formula (II):

$$Li_a(Fe_xNi_yMn_{2-x-y-z}A_z)O_4 \quad (II)$$

where $0.2 \le x \le 1.2$, $0 < y < 0.5$, $0 \le a \le 1.2$ and $0 < z \le 0.3$; A is at least one selected from the group consisting of Li, B, Na, Mg, Al, K and Ca.

In the formula (II), the composition ratio x of Fe is $0.2 \le x \le 1.2$. The case where x is less than 0.2 is not preferable in view of reducing cost and extending life. In contrast, if x exceeds 1.2, a crystal structure is destabilized and capacity drop occurs. This case is not preferable. In the formula (II), the composition ratio x of Fe is preferably $0.3 < x \le 1.0$ and more preferably $0.4 \le x \le 0.8$.

In the formula (II), composition ratio y of Ni is $0 < y < 0.5$. The case where y=0, in short, Ni is not contained, is not preferable in view of increasing capacity. In contrast, if y is 0.5 or more, it is not preferable in view of extending life. In the formula (II), composition ratio y of Ni is preferably $0.1 \le y \le 0.4$ and more preferably $0.2 \le y \le 0.4$.

A substitution element, Fe, for Mn is preferably trivalent in a discharge state and Ni is preferably divalent. If Mn is substituted with Fe, in the case where the composition ratio x of Fe is 1 in the formula (II), all of Mn are quadrivalent. In contrast, if Mn is substituted with Ni, in the case where the composition ratio y of Ni is 0.5, all of Mn are quadrivalent. In the exemplary embodiment, since Mn is substituted with both of Fe and Ni, it is preferable that, in the formula (II), $0.5 \le x+2y \le 1.3$, more preferable that $0.6 \le x+2y \le 1.2$, and particularly preferable that $x+2y=1$.

In the formula (II), the composition ratio a of Li satisfies $0 \le a \le 1.2$. The composition ratio a of Li preferably satisfies $0.8 \le a \le 1.1$.

In the positive electrode active material for a secondary battery according to the second aspect of the exemplary embodiment, a part of Mn is substituted with element A. Element A is a metal having a monovalence to a trivalence and at least one metal, which is lighter than Mn and selected from the group consisting of Li, B, Na, Mg, Al, K and Ca. Owing to introduction of element A, a high action potential is realized while preventing valence change of Mn; at the same time, weight reduction of an electrode and suppression of capacity drop with cycles can be attained. An effect of suppressing capacity drop with cycles can be obtained because a crystal structure can be presumably more stabilized by substituting Mn with element A. Element A is preferably at least one selected from the group consisting of Li, Mg and Al. In the formula (II), the composition ratio z of element A is $0 < z \le 0.3$. The composition ratio z of element A is preferably $0.05 \le z \le 0.2$.

The positive electrode active material for a secondary battery according to the second aspect of the exemplary embodiment preferably has a charge-discharge region due to valence change between a trivalence and a quadrivalence of Fe. The valence change between a trivalence and a quadrivalence of Fe occurs at 4.8 V or more to a lithium reference potential. Note that, whether the charge-discharge region is present or not can be determined by the discharge curve of a secondary battery using a target positive electrode active material.

The specific surface area of the positive electrode active material for a secondary battery according to the second aspect of the exemplary embodiment is preferably 0.01 m²/g or more and 3 m²/g or less and more preferably 0.05 m²/g or more and 1 m²/g or less. If the specific surface area is 3 m²/g or less, a large amount of binder is not required in preparing a positive electrode. It is advantageous in view of the capacity density of a positive electrode. Note that, the value of the specific surface area is measured by the BET method.

Examples of the raw material of the positive electrode active material for a secondary battery according to the second aspect of the exemplary embodiment are not particularly limited. For example, as a Li raw material, $Li_2CO_3$, LiOH, $Li_2O$ and $Li_2SO_4$ and the like can be used. Of them, $Li_2CO_3$, and LiOH are preferable. As a Mn raw material, various Mn oxides such as electrolyzed manganese dioxide (EMD), $Mn_2O_3$, $Mn_3O_4$ and CMD (chemical manganese dioxide), $MnCO_3$, $MnSO_4$ and others can be used. As a Fe raw material, $Fe_2O_3$, $Fe_3O_4$, Fe(OH)$_2$, FeOOH and others can be used. As a Ni raw material, NiO, Ni(OH), $NiSO_4$, $Ni(NO_3)_2$ and others can be used. As a raw material of element A, an oxide, a carbonate, a hydroxide, sulfide, nitrate of element A and others can be used. These may be used alone or in combination of two types or more.

These raw materials are weighed so as to satisfy a desired metal composition ratio and mixed. Mixing can be made by pulverizing and blending by a ball mill, a jet mill and others. The obtained powder mixture is baked at a temperature from 400° C. to 1200° C. in air or oxygen to obtain a lithium manganese composite oxide serving as a positive electrode active material. To diffuse individual elements, the baking temperature is preferably high. However, if the baking temperature is excessively high, oxygen deficiency occurs and battery characteristics may possibly deteriorate. From this, the baking temperature is preferably 450° C. to 1000° C. Note that, in the formula (II), the composition ratio of individual elements is calculated from supply amounts of raw materials of the individual elements.

[Positive Electrode for Secondary Battery]

A positive electrode for the secondary battery according to the exemplary embodiment has the positive electrode active material for a secondary battery according to the exemplary embodiment. The positive electrode for a secondary battery according to the exemplary embodiment can be prepared, for example, by the following method. The positive electrode active material according to the exemplary embodiment is mixed with a conductivity imparting agent and further a binder is mixed. The mixture is applied onto a collector.

As the conductivity imparting agent, not only a carbon material such as acetylene black, carbon black, fibrous carbon and graphite but also a metal substance such as Al, a conductive oxide powder and the like can be used. As the binder, polyvinylidene fluoride (PVDF) and others can be used. As the collector, a metal thin film mainly formed of Al and others can be used.

The addition amount of conductivity imparting agent is preferably 1 to 10 mass % relative to the positive electrode active material. If the addition amount of conductivity imparting agent is set at 1 mass % or more, sufficient conductivity can be obtained. Furthermore, if the addition amount of conductivity imparting agent is set at 10 mass % or less, the content of the positive electrode active material increases and thus capacity per mass can be increased.

The addition amount of binder is preferably 1 to 10 mass % relative to the positive electrode active material. If the addition amount of binder is set at 1 mass % or more, peel off of an electrode can be suppressed. Furthermore, if the addition amount of binder is set at 10 mass % or less, the content of positive electrode active material increases and thus capacity per mass can be increased.

[Secondary Battery]

A secondary battery according to the exemplary embodiment has the positive electrode for the secondary battery according to the exemplary embodiment.

(Constitution of Secondary Battery)

For example, a secondary battery according to the exemplary embodiment has the positive electrode for a secondary battery according to the exemplary embodiment, an electrolytic solution and a negative electrode arranged so as to face the positive electrode with the electrolytic solution interposed between them. More specifically, the secondary battery according to the exemplary embodiment includes, for example, the positive electrode for the secondary battery according to the exemplary embodiment, the negative electrode containing a negative electrode active material capable of absorbing and desorbing lithium, a separator interposed between the positive electrode and the negative electrode and preventing electrical contact between the positive electrode and the negative electrode and a lithium ion conductive electrolytic solution, in which the positive electrode, the negative electrode and the separator are to be soaked. These can be housed in a battery case airtight.

The shape of the secondary battery according to the exemplary embodiment is particularly not limited. For example, a roll type formed by rolling a positive electrode which faces a negative electrode with a separator sandwiched between them and a negative electrode, a laminate type formed by laminating a positive electrode which faces a negative electrode with a separator sandwiched between them and a negative electrode, and others can be used. As a cell, a coin-type and a laminate package can be used. The shape of the cell, a rectangular cell, a cylindrical cell and others can be used.

FIG. 1 shows a laminate type secondary battery as an example of a secondary battery according to the exemplary embodiment. The positive electrode is formed of a positive electrode active material layer 1 containing the positive electrode active material according to the exemplary embodiment and a positive electrode collector 3, and the negative electrode is formed of a negative electrode active material layer 2 and a negative electrode collector 4. Between the positive electrode and the negative electrode, a separator 5 is sandwiched. The positive electrode collector 3 is connected to a positive electrode lead terminal 8; where the negative electrode collector 4 is connected to a negative electrode lead terminal 7. As an outer package, an outer-package laminate 6 is used. The interior portion of the secondary battery is filled with the electrolytic solution.

(Electrolytic Solution)

As the electrolytic solution, a solution prepared by dissolving a lithium salt serving as an electrolyte in a solvent can be used. Examples of the solvent include cyclic carbonates such as propylene carbonate (PC), ethylene carbonate (EC), butylene carbonate (BC) and vinylene carbonate (VC); linear carbonates such as dimethyl carbonate (DMC), diethyl carbonate (DEC), ethylmethyl carbonate (EMC) and dipropyl carbonate (DPC); aliphatic carboxylic acid esters such as methyl formate, methyl acetate and ethyl propionate; γ-lactones such as γ-butyrolactone; linear ethers such as 1,2-diethoxyethane (DEE) and ethoxymethoxyethane (EME); cyclic ethers such as tetrahydrofuran and 2-methyltetrahydrofuran; and aprotonic organic solvents such as dimethylsulfoxide, 1,3-dioxolane, formamide, acetamide, dimethylformamide, acetonitrile, propylnitrile, nitromethane, ethylmonoglyme, phosphoric acid triester, trimethoxymethane, a dioxolane derivative, sulfolane, methylsulfolane, 1,3-dimethyl-2-imidazolidinone, 3-methyl-2-oxazolidinone, a propylene carbonate derivative, a tetrahydrofuran derivative, ethyl ether, 1,3-propanesultone, anisole, N-methylpyrrolidone and a fluorinated carboxylic acid ester. These can be used alone or as a mixture of two or more. Of them, propylene carbonate, ethylene carbonate, γ-butyrolactone, dimethyl carbonate, diethyl carbonate and ethylmethyl carbonate are preferably used alone or as a mixture.

Examples of the lithium salt include $LiPF_6$, $LiAsF_6$, $LiAlCl_4$, $LiClO_4$, $LiBF_4$, $LiSbF_6$, $LiCF_3SO_3$, $LiC_4F_9CO_3$, $LiC(CF_3SO_2)_2$, $LiN(CF_3SO_2)_2$, $LiN(C_2F_5SO_2)_2$, $LiB_{10}Cl_{10}$, a lithium salt of a lower aliphatic carboxylic acid, lithium chloroborane, lithium tetraphenylborate, LiBr, LiI, LiSCN, LiCl and an imide. These can be used alone or as a mixture of two or more types.

The electrolyte concentration of the electrolytic solution can be set, for example, 0.5 mol/l to 1.5 mol/l. If the electrolyte concentration is 1.5 mol/l or less, increases of the density and viscosity of the electrolytic solution can be suppressed. In contrast, if the electrolyte concentration is 0.5 mol/l or more, a sufficient electric conductivity of the electrolytic solution can be obtained. Note that, a polymer electrolyte may be used in place of the electrolytic solution.

(Negative Electrode)

The negative electrode can be prepared, for example, by the following method. The negative electrode active material is mixed with a conductivity imparting agent and further a binder is mixed. The mixture is applied onto a collector.

As the negative electrode active material, a material capable of absorbing and desorbing lithium, carbon materials such as graphite, hard carbon and soft carbon; Li metals, Si, Sn, Al, SiO, SnO and $Li_4Ti_5O_{12}$ can be used alone or as a mixture. As the conductivity imparting agent, not only carbon materials such as acetylene black, carbon black, fibrous carbon and graphite, but also a conductive oxide powder and others can be used. Examples of the binder, polyvinylidene fluoride (PVDF) can be used. As the collector, metal foils mainly formed of Al, Cu and the like can be used.

(Method for Preparing Secondary Battery)

The secondary battery according to the exemplary embodiment can be prepared, for example, by forming a laminate by laminating the positive electrode for the secondary battery according to the exemplary embodiment and the negative electrode with the separator interposed between them and housing the laminate in a battery can, in a dry air or inert gas atmosphere. Furthermore, the laminate can be sealed with e.g., a flexible film prepared by laminating a synthesis resin and a metal foil. Note that, in place of the laminate, a rolled laminate can be used.

EXAMPLES

Examples of the exemplary embodiments will be described below.

Example 1

Raw materials for a positive electrode active material, $MnO_2$, $Fe_2O_3$, NiO, $Al_2O_3$ and $Li_2CO_3$ were weighed so as to satisfy the metal composition ratio shown in Table 1, pulverized and mixed. The raw material powder mixture was baked at 800° C. for 8 hours to prepare a positive electrode active material.

(Evaluation of Discharge Capacity and Average Discharge Voltage)

The positive electrode active material prepared and carbon (trade name: VGCF, manufactured by Showa Denko K. K.) serving as a conductivity imparting agent were mixed and dispersed in a solution having polyvinylidene fluoride (PVDF) serving as a binder dissolved in N-methylpyrrolidone to obtain slurry. The mass ratio of the positive electrode active material, conductivity imparting agent and binder was set at 92/4/4. Onto an Al collector, the slurry was applied. Thereafter, the slurry was dried in vacuum for 12 hours to obtain an electrode material. From the electrode material, a circle having a diameter of 12 mm was cut out, compressed and molded at 3 t/cm². In this manner, a positive electrode was prepared. As the negative electrode, a Li metal foil was used. As the separator, a polypropylene (PP) film was used. The positive electrode and negative electrode were arranged within a laminate cell so as to face each other with the separator interposed between them. The cell was filled with an electrolytic solution and closed airtight. As the electrolytic solution, a solution prepared by dissolving an electrolyte $LiPF_6$ in a solvent of EC/DMC=4/6 (vol. %) in a concentration of 1 mol/l was used.

The secondary battery prepared in the aforementioned manner was evaluated for battery characteristics. In evaluation, the battery was charged at a charge rate of 0.1 C up to 5.2 V and discharged at a rate of 0.1 C up to 3 V. Table 1 shows discharge capacity, average discharge voltage to lithium metal and discharge energy per positive electrode active material by mass to the potential of lithium metal.

(Evaluation of Cycle Characteristics)

Using the positive electrode, cycle characteristics were evaluated. A negative electrode was prepared as follows. To graphite serving as a negative electrode active material, carbon (trade name: VGCF, manufactured by Showa Denko K. K.) serving as a conductivity imparting agent was added. This mixture was dispersed in a solution having polyvinylidene fluoride (PVDF) dissolved in N-methylpyrrolidone to obtain slurry. The mass ratio of the negative electrode active material, conductivity imparting agent and binder was set at 90/1/9. Onto a Cu collector, the slurry was applied. Thereafter, the slurry was dried in vacuum for 12 hours to obtain an electrode material. From the electrode material, a circle having a diameter of 13 mm was cut out, compressed and molded at 1.5 t/cm² to obtain a negative electrode. As the separator, a PP film was used. The positive electrode and the negative electrode were arranged within a coin cell so as to face each other with the separator interposed between them. The interior portion of the coin cell was filled with the electrolytic solution and closed airtight to prepare a secondary battery. As the electrolytic solution, a solution prepared by dissolving an electrolyte $LiPF_6$ in a solvent of EC/DMC=4/6 (vol. %) in a concentration of 1 mol/l was used.

Cycle characteristics were evaluated by charging a battery at a charge rate of 1 C up to 5.1 V in a constant-temperature vessel of a temperature of 20° C. and thereafter charged at a constant voltage of 5.1 V. The total charging time was set at 150 minutes. Then, the battery was discharged at a rate of 1 C up to 3 V. This procedure was repeated 500 cycles. Thereafter, capacity retention rate was evaluated. The results are shown in Table 1.

Examples 2 to 15, Comparative Examples 1 and 2

Secondary batteries were prepared in the same manner as in Example 1 except that positive electrode active materials having the compositions shown in Table 1 were prepared in the same manner as in Example 1, and evaluated for discharge capacity, average discharge voltage and cycle characteristics. The results are shown in Table 1. Note that MgO was used as a raw material for Mg, $B_2O_3$ as a raw material for B, $Na_2O$ as a raw material for Na, $K_2O$ as a raw material for K and CaO as a raw material for Ca.

TABLE 1

|  | Composition formula | Capacity retention rate after 500 cycles [%] | Discharge capacity [mAh/g] | Average discharge voltage [V] | Discharge energy [mWh/g] |
| --- | --- | --- | --- | --- | --- |
| Comparative Example 1 | $Li(Mn_{1.9}Al_{0.1})O_4$ | 75 | 110 | 4.00 | 440 |
| Comparative Example 2 | $Li(Fe_{0.4}Mn_{1.6})O_4$ | 48 | 110 | 4.26 | 469 |

TABLE 1-continued

| | Composition formula | Capacity retention rate after 500 cycles [%] | Discharge capacity [mAh/g] | Average discharge voltage [V] | Discharge energy [mWh/g] |
|---|---|---|---|---|---|
| Example 1 | Li(Fe$_{0.4}$Ni$_{0.3}$Mn$_{1.25}$Al$_{0.05}$)O$_4$ | 61 | 123 | 4.61 | 567 |
| Example 2 | Li(Fe$_{0.5}$Ni$_{0.25}$Mn$_{1.2}$Al$_{0.05}$)O$_4$ | 58 | 117 | 4.61 | 539 |
| Example 3 | Li(Fe$_{0.6}$Ni$_{0.2}$Mn$_{1.15}$Al$_{0.05}$)O$_4$ | 57 | 115 | 4.63 | 532 |
| Example 4 | Li(Fe$_{0.8}$Ni$_{0.1}$Mn$_{1.05}$Al$_{0.05}$)O$_4$ | 54 | 107 | 4.64 | 496 |
| Example 5 | Li(Fe$_{0.4}$Ni$_{0.3}$Mn$_{1.2}$Al$_{0.1}$)O$_4$ | 67 | 119 | 4.62 | 550 |
| Example 6 | Li(Fe$_{0.4}$Ni$_{0.3}$Mn$_{1.1}$Al$_{0.2}$)O$_4$ | 69 | 112 | 4.60 | 515 |
| Example 7 | Li(Fe$_{0.4}$Ni$_{0.3}$Mn$_{1.25}$Li$_{0.05}$)O$_4$ | 71 | 117 | 4.59 | 537 |
| Example 8 | Li(Fe$_{0.4}$Ni$_{0.3}$Mn$_{1.25}$Mg$_{0.05}$)O$_4$ | 70 | 118 | 4.61 | 544 |
| Example 9 | Li(Fe$_{0.4}$Ni$_{0.3}$Mn$_{1.25}$B$_{0.05}$)O$_4$ | 63 | 122 | 4.62 | 564 |
| Example 10 | Li(Fe$_{0.4}$Ni$_{0.3}$Mn$_{1.25}$Na$_{0.05}$)O$_4$ | 66 | 113 | 4.57 | 516 |
| Example 11 | Li(Fe$_{0.4}$Ni$_{0.3}$Mn$_{1.25}$Ca$_{0.05}$)O$_4$ | 64 | 114 | 4.59 | 523 |
| Example 12 | Li(Fe$_{0.4}$Ni$_{0.3}$Mn$_{1.25}$K$_{0.05}$)O$_4$ | 62 | 109 | 4.58 | 499 |
| Example 13 | Li(Fe$_{0.4}$Ni$_{0.3}$Mn$_{1.2}$Li$_{0.05}$Mg$_{0.05}$)O$_4$ | 73 | 108 | 4.57 | 494 |
| Example 14 | Li(Fe$_{0.4}$Ni$_{0.3}$Mn$_{1.2}$Al$_{0.05}$Mg$_{0.05}$)O$_4$ | 62 | 113 | 4.59 | 519 |
| Example 15 | Li(Fe$_{0.4}$Ni$_{0.3}$Mn$_{1.3}$)O$_4$ | 50 | 127 | 4.62 | 587 |

Figure 2:
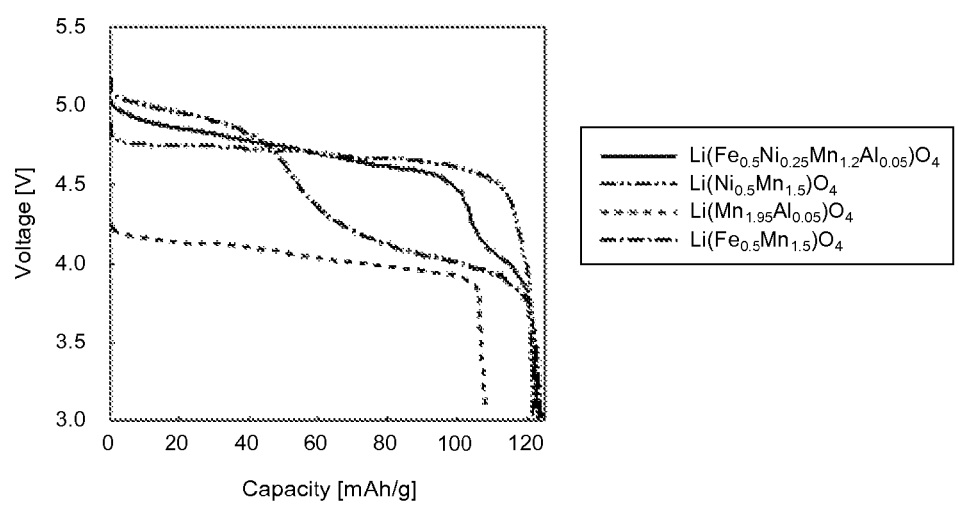
FIG. 2 is a graph showing discharge curves of secondary batteries using various positive electrode active materials.

A discharge curve of the secondary battery prepared for evaluation of discharge capacity and average discharge voltage in Example 2 is shown in FIG. 2. In FIG. 2, discharge curves of secondary batteries prepared by use of other positive electrode active materials (Li(Ni$_{0.5}$Mn$_{1.5}$)O$_4$, Li(Mn$_{1.95}$Al$_{0.05}$)O$_4$, Li(Fe$_{0.5}$Mn$_{1.5}$)O$_4$) prepared in the same manner as in Example 1 are shown together. It was confirmed that in the secondary battery prepared in Example 2, a charge-discharge region due to valence change of Fe from a trivalence to a quadrivalence is present in the region of 4.8 V or more to Li and a charge-discharge region due to valence change of Ni from a divalence to a quadrivalence is present in the region of 4.5 V or more.

As shown in Example 15, it was confirmed that discharge energy increased in the case of the composition of the formula (I) compared to Comparative Examples 1 and 2.

As shown in Examples 1 to 14, it was confirmed that the capacity retention rate after cycles is improved, compared to Example 15, in the case of the formula (II) composition. This is presumably because the capacity retention rate after cycles was improved by the effects of a stabilized crystal structure and suppression of Mn elution and others.

As shown in Examples 1 to 4, it was confirmed that even if a substitution amount x of Fe was changed in the formula (II), the capacity retention rate after cycles is improved.

As shown in Examples 1, 5 and 6, it was confirmed that even if a substitution amount z of element A was changed in the formula (II), the capacity retention rate after cycles is improved.

As shown in Examples 7 to 12, it was confirmed that even if Li, Mg, B, Na, Ca or K was used as element A in the formula (II), the capacity retention rate after cycles is improved.

As shown in Examples 13 and 14, it was confirmed that even if elements of two kinds or more were used as element A in the formula (II), the capacity retention rate after cycles is improved.

This application claims a priority based on Japanese Patent Application No. 2010-248778 filed Nov. 5, 2010, the disclosure of which is incorporated herein in its entirety.

In the above, the invention of the present application has been explained by way of exemplary embodiments and Examples; however, the invention of the present application is not limited to the above exemplary embodiments and Examples. The constitution and details of the invention of the present application can be modified in various ways within the scope of the invention of the present application as long as those skilled in the art can understand them.

REFERENCE SIGNS LIST

1 Positive electrode active material layer
2 Negative electrode active material layer
3 Positive electrode collector
4 Negative electrode collector
5 Separator
6 Outer-package laminate
7 Negative electrode lead terminal
8 Positive electrode lead terminal

The invention claimed is:

1. A positive electrode active material for a secondary battery, represented by the following formula (II):

$$Li_a(Fe_xNi_yMn_{2-x-y-z}A_z)O_4 \quad (II)$$

where $0.4 \leq x \leq 1.2$, $0.2 < y < 0.5$, $0 \leq a \leq 1.2$ and $0 < z \leq 0.3$; and A is at least one selected from the group consisting of B, Na, Mg, Al, K and Ca.

2. The positive electrode active material for a secondary battery according to claim 1, wherein, in the formula (II), x satisfies $0.4 \leq x \leq 0.8$.

3. The positive electrode active material for a secondary battery according to claim 1, wherein, in the formula (II), A is at least one selected from the group consisting of Mg and Al.

4. The positive electrode active material for a secondary battery according to claim 1, having a charge-discharge region due to valence change between a trivalence and a quadrivalence of Fe.

5. A positive electrode for a secondary battery, comprising the positive electrode active material for a secondary battery according to claim 1.

6. A secondary battery comprising the positive electrode for a secondary battery according to claim 5.

7. The positive electrode active material for a secondary battery according to claim 2, wherein, in the formula (II), A is at least one selected from the group consisting of Mg and Al.

8. The positive electrode active material for a secondary battery according to claim 2, having a charge-discharge region due to valence change between a trivalence and a quadrivalence of Fe.

9. The positive electrode active material for a secondary battery according to claim 3, having a charge-discharge region due to valence change between a trivalence and a quadrivalence of Fe.

10. The positive electrode active material for a secondary battery according to claim 7, having a charge-discharge region due to valence change between a trivalence and a quadrivalence of Fe.

11. A positive electrode for a secondary battery, comprising the positive electrode active material for a secondary battery according to claim 2.

12. A positive electrode for a secondary battery, comprising the positive electrode active material for a secondary battery according to claim 3.

13. A positive electrode for a secondary battery, comprising the positive electrode active material for a secondary battery according to claim 4.

14. A positive electrode for a secondary battery, comprising the positive electrode active material for a secondary battery according to claim 7.

15. A positive electrode for a secondary battery, comprising the positive electrode active material for a secondary battery according to claim 8.

16. A positive electrode for a secondary battery, comprising the positive electrode active material for a secondary battery according to claim 9.

17. A positive electrode for a secondary battery, comprising the positive electrode active material for a secondary battery according to claim 10.

18. A secondary battery comprising the positive electrode for a secondary battery according to claim 11.

19. A secondary battery comprising the positive electrode for a secondary battery according to claim 12.

20. A secondary battery comprising the positive electrode for a secondary battery according to claim 13.

* * * * *